July 26, 1927.
E. WILLNER
INFUSER
Filed Aug. 6, 1926
1,636,727
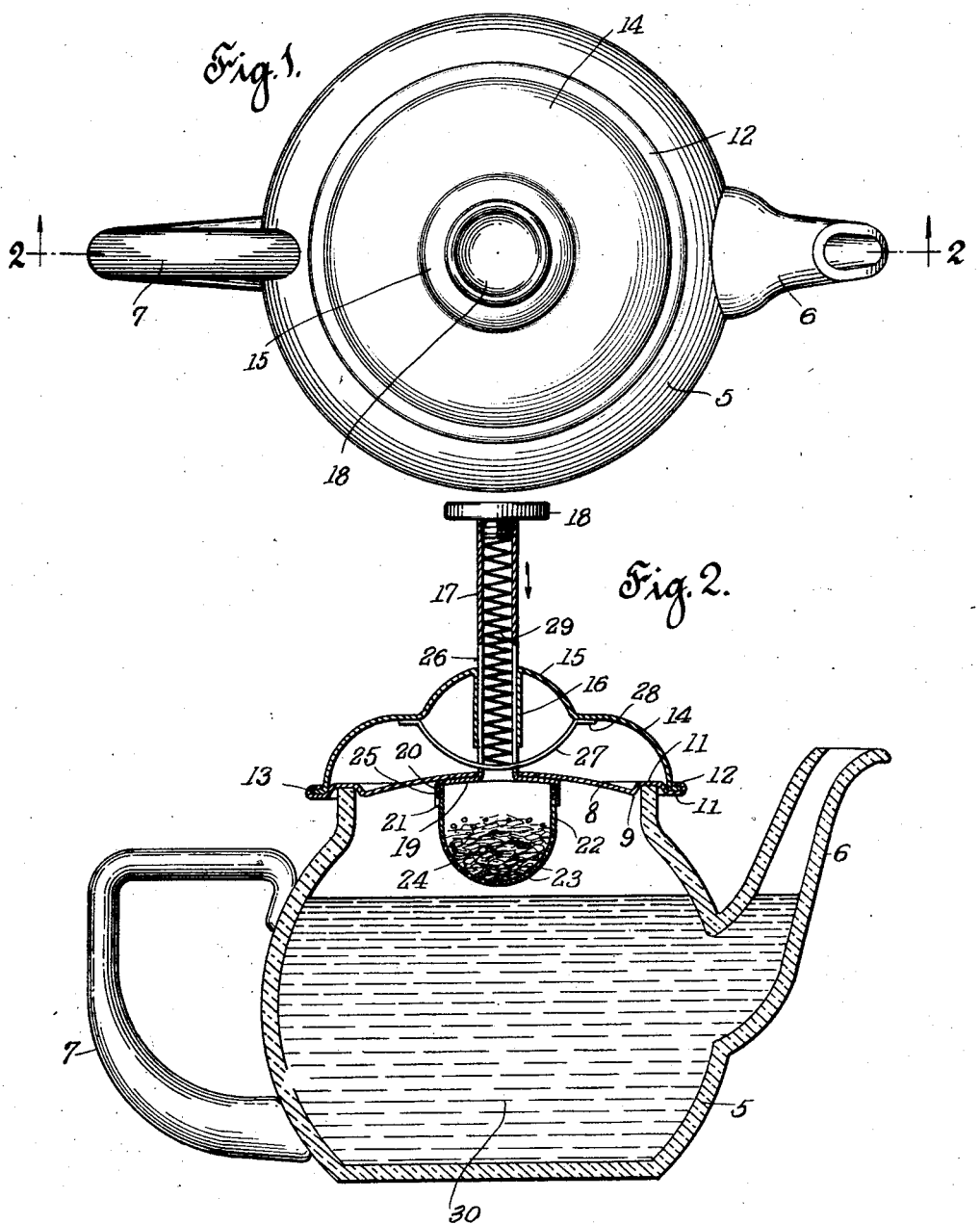
INVENTOR.
Elias Willner
BY Percy Freeman
ATTORNEY Patented July 26, 1927.

1,636,727

UNITED STATES PATENT OFFICE.

ELIAS WILLNER, OF NEW YORK, N. Y.

INFUSER.

Application filed August 6, 1926. Serial No. 127,550.

This invention relates to devices for obtaining an infusion of any dry substance, with special reference to the brewing of a beverage from tea leaves.

In order to prepare such a drink in its most delectable condition, it is desirable to use a definite amount of the dry tea leaves, proportional to the quantity of water and experience has demonstrated that cooking the leaves directly in the water by long continued boiling produces an unpalatable decoction wholly undesirable.

It is therefore one of the objects of the present invention to provide a perforated container for the tea leaves, normally raised above the level of the water and so arranged that it may be immersed for such a period of time as may be required to produce an infusion of desirable strength.

A further feature is in the provision of a tea leaf container that is removably engaged with its support and therefore permit its contents to be readily removed and renewed as required.

Another purpose is to provide an apparatus in which the aromatic and volatile extracts of teas are conserved and prevented from escape from the apparatus.

These several advantages are attained by the novel and practical construction and combination of parts hereinafter described and shown in the accompanying drawing, forming a material part of this disclosure, and in which:—

Figure 1 is a plan view of an embodiment of the invention.

Figure 2 is a sectional view thereof, the section being taken in a plane indicated by the line 2—2 of Figure 1.

A conventional type of cooking utensil or pot is generally designated by the numeral 5, the same having a flat circular opening at the top, and extending outward and upward from a point midway in the height of the pot is a spout 6 preferably reaching above the top, a handle 7 being attached to the body opposite the spout.

The preferred material from which the pot is constructed is that known as "pyrex" because of its transparency, ability to withstand heat and readiness with which its smooth surfaces may be cleaned, but it is obvious that any other suitable material may be used.

The invention resides more properly in the cover, which in the present case consists of a circular plate of sheet metal shaped to present a convex lower side 8 its edge 9 permitting any condensed steam to drip back into the pot rather than follow the raised annular seat 10 which rests over the edge of the pot.

A marginal continuation 11 of the seat is turned reentrantly to form a bead 12 which tightly encloses the flanged edge 13 of a dome shaped upper element 14 of the cover, the same having at its center a raised semispherical element 15.

Extending axially down from the crown element 15 is a tubular guide 16 to receive a hollow slidable plunger 17 having at its upper extending end a knob cap 18, preferably of porcelain or like non-conductor of heat, this knob being rigidly fixed in the plunger.

The inner, lower end of the plunger 17 passes through an opening in the cover plate 8 and is expanded outwardly therebelow into a flange 19 having an annular band 20 at its edge provided with orifices 21 diametrically opposite in its sides.

A cup 22, having perforations 23 in its wall, to retain the substance 24 to be infused, is provided with oppositely extending lugs 25 to engage in the orifices 21 in the manner of the well known bayonet joint, whereby the cup may be detachably secured to the plunger 17.

This plunger contains a pair of opposed slots 26 in its lower portion and passed therethrough is a narrow downwardly curved support 27 reaching nearly to the plate 18 and having its ends 28 secured to the under side of the cover element 14.

A spirally wound compression spring 29 is disposed in the plunger 17, its ends abutting the knob 18 and support 27 respectively, thereby exerting its force to raise the plunger and tea containing cup 22 normally above the liquid 30 in the pot 5.

In operation the water is heated to a boiling point whereupon the knob 18 is depressed, causing the material 24, as tea leaves, to become submerged and is retained therein as long as may be desirable; releasing the knob obviously allows the cup 22 to rise under action of the spring.

Thus an infusion of any required strength may be readily obtained and it is noticeable that the aroma of the infusion is completely conserved.

From the foregoing it will be seen that a simple device for this purpose has been disclosed, but it is obvious that changes may be made without conflicting with the scope of the appended claims.

Having thus described my invention, what I claim is:—

1. A pot cover comprising a convex circular lower plate provided with an inreaching annulus to seat upon a pot, a convex plate engaged at its edge with the first named plate to extend spacedly thereover, a plunger movable through said plates, said plunger having a non-conducting knob, a spring in said plunger to retain it normally raised, and a perforate cup removably engaged with said plunger below said plates.

2. A pot cover comprising a pair of spaced circular plates joined at their edges and adapted to rest upon a pot, a hollow plunger operable through said plates, a perforate container, means to detachably engage said container with said plunger, resilient means in said plunger to normally retain said container in a raised position, and means for depressing said plunger.

3. A pot cover comprising a pair of spaced circular plates relatively upper and lower rigidly joined at their edges and adapted to rest upon a pot over the opening therein, means on the lower plate to return condensed moisture to the pot, a spring raised plunger operable axially through said plates, a guide on the upper plate for said plunger, a support for the plunger spring between said plates, a perforate container removably attached to said plunger to extend into the pot, and means to depress said plunger.

4. A pot cover comprising a pair of spaced circular plates joined at their edges and adapted to rest upon a pot, a hollow plunger operable axially through said plates, said plunger having opposed slots, a support strip fixed to one of said plates to pass through the plunger slots, a knob on said plunger, a compression spring in said plunger between said support strip and knob, and a container removably attached at the inner end of said plunger.

5. A pot cover comprising a pair of spaced circular plates joined at their edges and adapted to rest upon a pot, a hollow spring raised plunger operable axially through said plates, an actuating knob on the upper end of said plunger, an expanded annular flange on the inner end of the plunger below the plates, a perforate cup, and means to removably engage said cup within said annular flange.

Signed at New York in the county of New York and State of New York this 23rd day of July, A. D. 1926.

ELIAS WILLNER.